United States Patent

Mishra

(10) Patent No.: US 9,380,424 B2
(45) Date of Patent: Jun. 28, 2016

(54) CROWDSOURCED SIGNAL PROPAGATION MODEL

(71) Applicant: GOOGLE INC., Mountain View, CA (US)

(72) Inventor: Arunesh Mishra, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 13/828,394

(22) Filed: Mar. 14, 2013

(65) Prior Publication Data

US 2015/0163633 A1    Jun. 11, 2015

Related U.S. Application Data (60) Provisional application No. 61/657,333, filed on Jun. 8, 2012.

(51) Int. Cl.
*H04W 24/00* (2009.01)
*H04W 4/02* (2009.01)

(52) U.S. Cl.
CPC ..................... *H04W 4/023* (2013.01)

(58) Field of Classification Search
CPC ............................... H04W 16/20; G01R 29/08
USPC ...................... 455/456.1, 456.2, 456.3, 456.6; 370/338
See application file for complete search history.

(56) References Cited

U.S. PATENT DOCUMENTS

| 5,450,615 A * | 9/1995 | Fortune et al. ............. 455/67.16 |
| 8,077,090 B1 * | 12/2011 | Chintalapudi et al. ........ 342/451 |
| 2010/0135178 A1 * | 6/2010 | Aggarwal et al. ............. 370/252 |
| 2010/0265093 A1 * | 10/2010 | Cho et al. ................. 340/825.49 |
| 2013/0184012 A1 * | 7/2013 | Gupta et al. ................ 455/456.6 |
| 2013/0244684 A1 * | 9/2013 | Kadous et al. ............. 455/456.1 |
| 2014/0045515 A1 * | 2/2014 | Austin et al. ............... 455/456.1 |

OTHER PUBLICATIONS

S. Seidel and T. Rappaport, "914 MHz Path Loss Prediction Models for Indoor Wireless Communications in Multifloored Buildings", Feb. 1992, IEEE Transactions on Antennas and Propagation, vol. 40, No. 2, p. 207-217.*

(Continued)

*Primary Examiner* — Wayne Cai
*Assistant Examiner* — Said Elnoubi
(74) *Attorney, Agent, or Firm* — Marshall, Gerstein & Borun LLP (57) ABSTRACT

According to an embodiment, a method of estimating a distance to a wireless access point in an indoor environment using a signal propagation model begins with the receipt of a first received signal strength value based on a signal received at a first device from a wireless access point in the indoor environment. Based on a predetermined characteristic of the indoor environment, an estimate is made that the received signal originated from a first distance from the first device. A signal propagation characteristic is estimated based on the first signal strength and the estimated first distance and a plurality of signal samples are received from a plurality of devices. Finally, a signal propagation model for the indoor environment is created based on the signal propagation characteristic and the signal samples, and a distance to any wireless access point in the indoor environment is estimated based on the signal propagation model.

18 Claims, 10 Drawing Sheets

(56) References Cited

OTHER PUBLICATIONS

Seidel et al. ,914 MHz Path Loss Prediction Models for Indoor Wireless Communications in Multifloored Buildings, IEEE Transactions on Antennas and Propagation, Feb. 1992, vol. 40, No. 2.*

Gallagher, T., et al., "Database Updating Through User Feedback in Fingerprint-Based Wi-Fi Location Systems," in *Ubiquitous Positioning Indoor Navigation and Location Based Service (UPINLBS)*, Institute of Electrical and Electronics Engineers, DOI: 10.1109/UPINLBS.2010.5654329, United States (2010), pp. 1-8.

Laoudias, Christos, "Indoor Positioning Technologies and Systems From Theory to Practice," slideshow, KIOS Tuesday Seminar Series, KIOS Research Center for Intelligent Systems and Networks, Department of Electrical and Computer Engineering, Universiy of Cyprus, Cyprus (2012), pp. 1-63.

* cited by examiner

FIG. 1

$$PL(dB) = PL(d_0) + 10n\log\left(\frac{d}{d_0}\right) + X_\sigma$$

CROWDSOURCED SIGNAL PROPAGATION MODEL

CROSS REFERENCE TO RELATED APPLICATIONS

This application claims the benefit of U.S. Provisional Patent Application No. 61/657,333, filed Jun. 8, 2012, entitled "Crowdsourced Signal Propagation Model," which is incorporated herein in its entirety by reference.

FIELD

This description relates to wireless signals. More particularly, it relates to the propagation of wireless signals in an indoor environment.

BACKGROUND

Estimating wireless propagation characteristics of a signal in an indoor environment can be challenging. Signal interference, different building materials used, placement of wireless access points, the presence of people, and other factors, can combine to give different indoor environments significantly different wireless propagation characteristics.

Traditional approaches to estimating wireless signal propagation characteristics are labor-intensive and require precise measurements for each indoor environment.

BRIEF SUMMARY

Embodiments described herein relate to a method of estimating a distance to a wireless access point in an indoor environment using a signal propagation model. According to an embodiment, the method begins with the receipt of a first received signal strength (RSS) value based on a first signal received at a first device from a wireless access point in the indoor environment. Based on a predetermined characteristic of the indoor environment, an estimate is made that the received first signal originated from a first distance from the first device. A signal propagation characteristic is estimated based on the first signal strength and the estimated first distance. A plurality of signal samples are received from a plurality of devices, the signal samples originating from the wireless access point. Finally, a signal propagation model for the indoor environment is created based on the signal propagation characteristic and the plurality of signal samples. A distance to any wireless access point in the indoor environment is estimated based on the signal propagation model.

A system for estimating a distance from a wireless access point inside an indoor environment using a signal propagation model includes a sample receiver configured to receive a first received signal strength (RSS) value based on a first signal received at a first device from a first access point in the indoor environment. A propagation characteristic estimator is configured to estimate, based on a predetermined characteristic of the indoor environment, that the received first signal originated from a first distance from the first device. A signal propagation characteristic is generated based on the first signal strength and the estimated first distance. A propagation model generator is configured to create a signal propagation model for the indoor environment based on the signal propagation characteristic and a plurality of signal samples received from a plurality of devices, the signal samples originating from wireless access points inside the structure. Finally, a wireless distance estimator is configured to estimate the distance to the wireless access point based on the signal propagation model.

Further features and advantages, as well as the structure and operation of various embodiments are described in detail below with reference to the accompanying drawings.

BRIEF DESCRIPTION OF THE FIGURES

Embodiments are described herein with reference to the accompanying drawings. In the drawings, like reference numbers may indicate identical or functionally similar elements. The drawing in which an element first appears is generally indicated by the left-most digit in the corresponding reference number.

DESCRIPTION OF EMBODIMENTS

The following detailed description of embodiments refers to the accompanying drawings that illustrate exemplary embodiments. Other embodiments are possible, and modifications may be made to the embodiments within the spirit and scope of the invention. Therefore, the detailed description is not meant to limit embodiments. Rather, the scope is defined by the appended claims.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description.

Thus, the operational behavior of embodiments is described with the understanding that modifications and variations of the embodiments are possible, given the level of detail presented herein.

Overview of Embodiments

An embodiment uses a collection of wireless signal sample data from multiple mobile devices (also known as crowd-sourced data) to generate a wireless signal propagation model for an indoor environment. Based on the crowdsourced data, different aspects of a propagation model are estimated. One approach used by an embodiment estimates model parameters by a statistical inferencing method. One having skill in the relevant art(s), given the description herein, will appreciate that other estimating approaches may be used. Once the indoor propagation model is created, it can be used to estimate the distance from a mobile device to an access point in the indoor environment.

Figure 1:
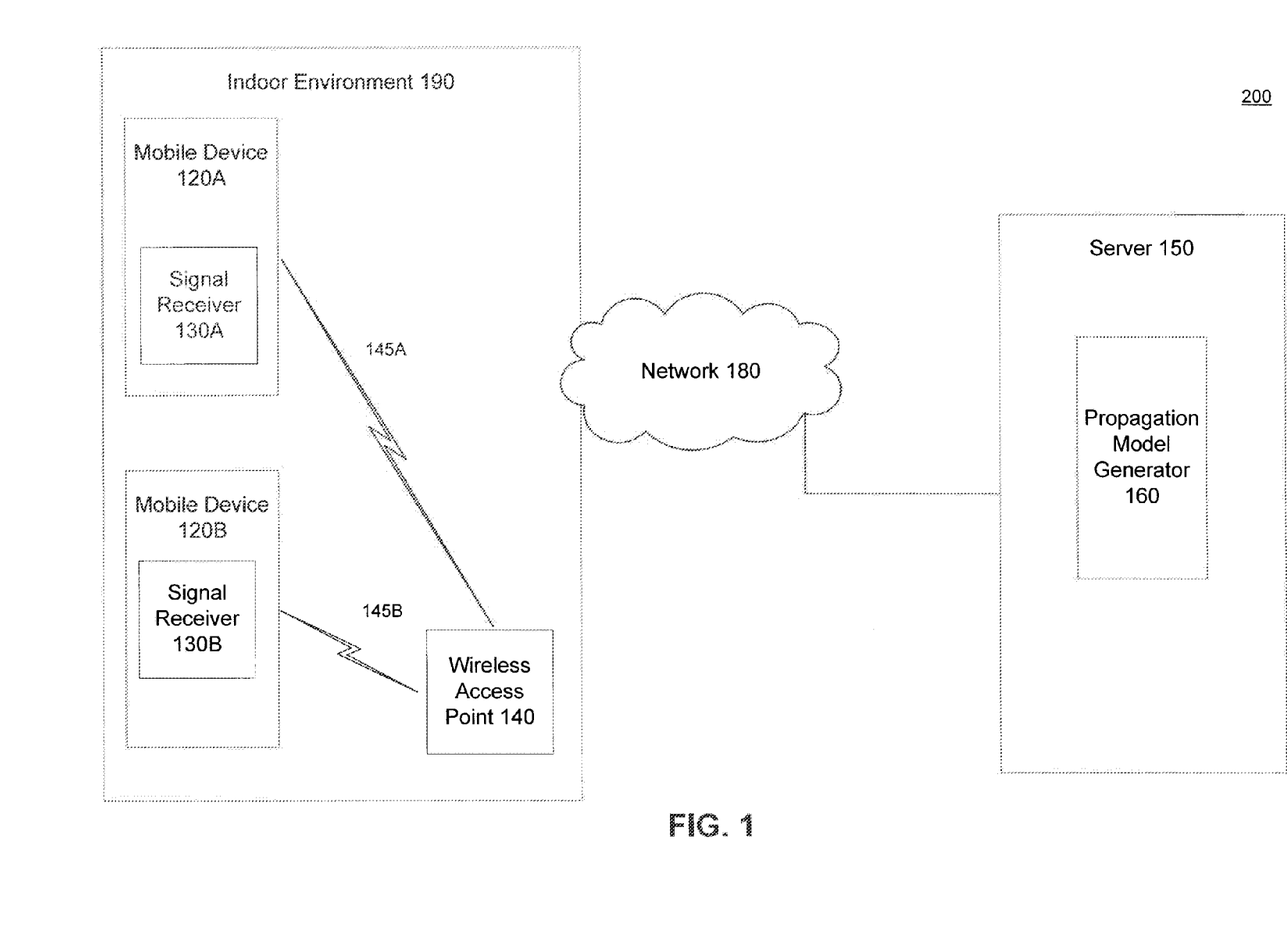
FIG. 1 is a block diagram of a network architecture having mobile devices, a propagation model generator and a wireless access point, according to an embodiment.

FIG. 1 is a block diagram of a network architecture 100 having a mobile devices 120A-B coupled to server 150 via network 180 and a wireless access point 140, according to an embodiment. The coupling between mobile devices 120A-B and network is not shown for clarity. Only two mobile devices 120A-B are shown for clarity, however, this is illustrative only and a large number of mobile devices may be used. Server 150 has a propagation model generator 160. Mobile devices 120A-B receive respective wireless signals 145A-B from wireless access point 140. Mobile devices 120A-B, wireless signals 145A-B and wireless access point 140 are all inside indoor environment 190.

In FIG. 1, mobile devices 120A-B measure and store the signal strength of respective wireless signals 145A-B produced by wireless access point 140. Using network 180, mobile devices 120A-B send the collected sample data to propagation model generator 160 at server 150. Using approaches described below with reference to FIG. 2-6, propagation model generator 160 generates a propagation model for indoor environment 190. Once generated, the propagation model can be used to estimate signal propagation for other wireless access points in indoor environment 190.

Figure 2:
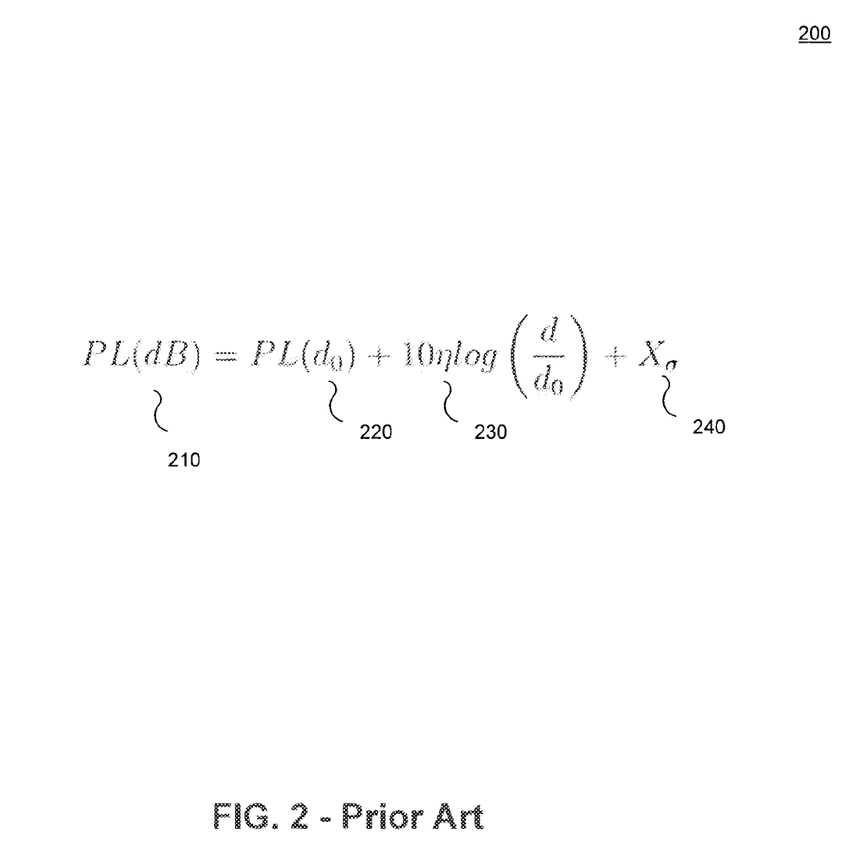
FIG. 2 shows conventional log-distance path loss equation for measuring indoor signal propagation.

FIG. 2 shows an example conventional log-distance path loss equation for measuring indoor signal propagation. The equation relies upon several coefficients:

PL(dB) 210—This represents the propagation loss of a wireless signal at distance d.

PL(d0) 220—This is an indoor signal propagation loss at a known distance $d_0$. This value can also be termed a "known distance propagation loss."

η 230—This symbol represents a value corresponding to a measure of how fast a wireless signal degrades over a distance.

$X_\sigma$ 240—This value represents a (zero-mean) norma random variable X measured in dB having a standard deviation of σ.

An embodiment described herein estimates the value of PL($d_0$) 220 and uses the estimated value to generate "shadow distribution curves" with equation 200 and different values for η 230 and σ 240. Once the shadow distribution curves are generated, samples are collected and a collected sample distribution curve is generated. This sample distribution curve is compared to the generated shadow distribution curves and the closest match is selected. The values of η 230 and a σ 240 that generated the selected shadow distribution curve are used to generate a wireless signal propagation model based on equation 200.

Though equation 200 is used to describe some embodiments herein, it would be appreciated by one having skill in the relevant art(s), given the description herein, that other propagation equations in addition to equation 200 can be used with the techniques described herein. Examples using equation 200 are not intended to be limiting of embodiments.

Propagation Model Generator

Figure 3:
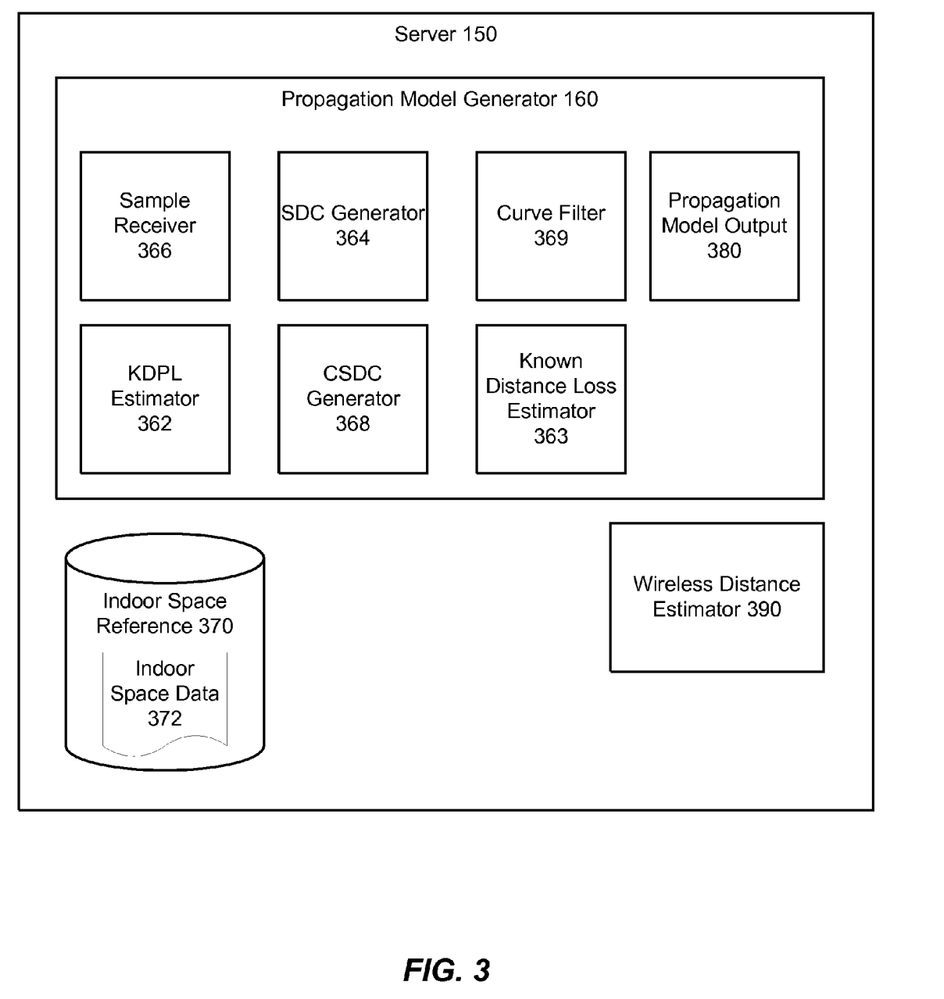
FIG. 3 is a detailed block diagram of server having a propagation model generator and a wireless distance estimator, according to an embodiment.

FIG. 3 is a detailed block diagram of server 150 having propagation model generator 160. Propagation model generator 160 includes: sample receiver 366, known distance estimator 362, known distance propagation loss estimator 363, shadow distribution curve (SDC) generator 364, collected sample distribution curve (CSDC) generator 368, curve fitter 369 and propagation model output 380. Server 150 also includes wireless distance estimator 390 and indoor space reference storage device 370. The indoor space reference storage device 370 stores indoor space data 372. As noted with reference to the descriptions of FIGS. 4-7 below, components detailed on FIG. 3 can be used to perform different features of embodiments.

Figure 4:
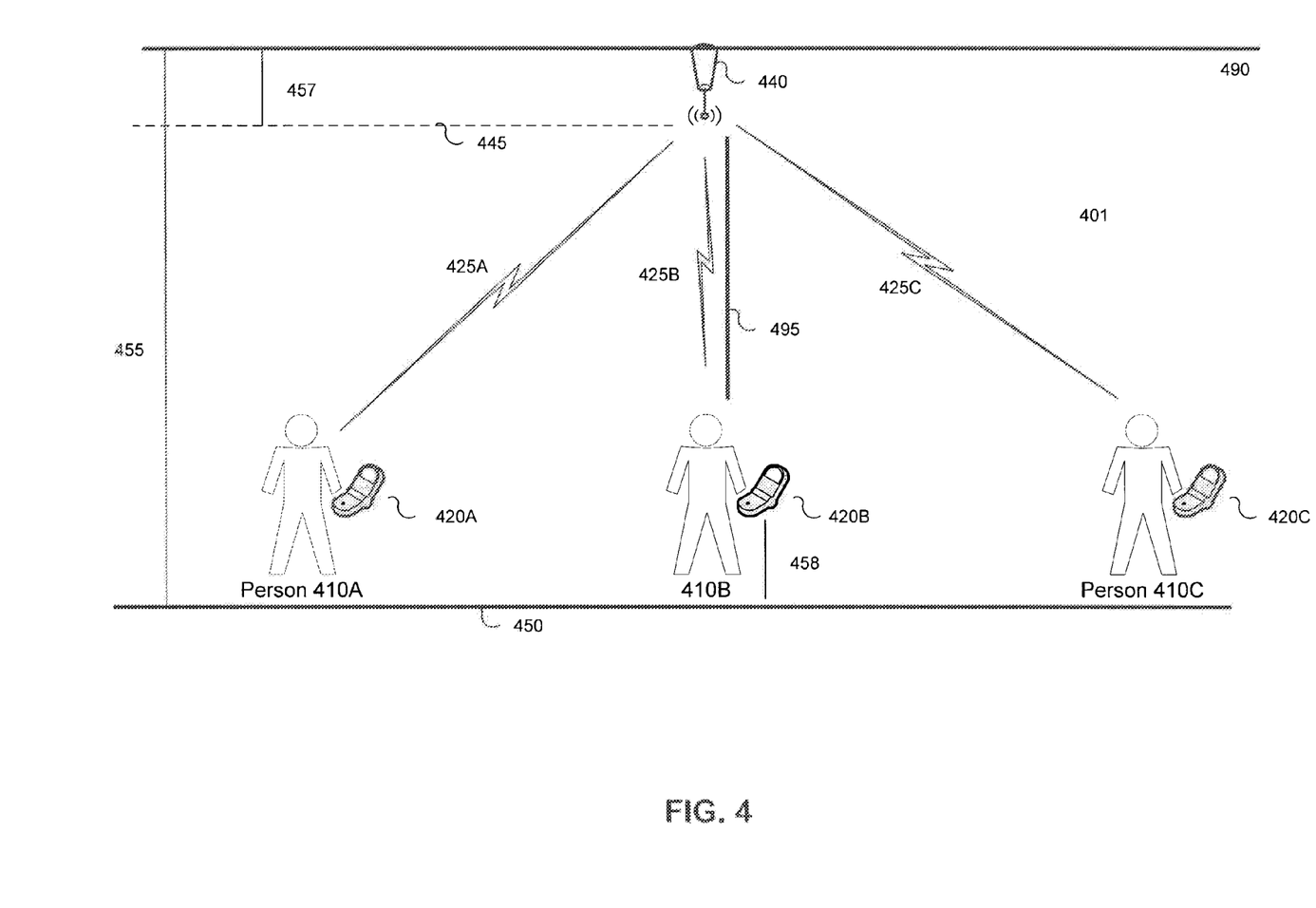
FIG. 4 is a diagram of an indoor environment having a ceiling mounted wireless access point, according to an embodiment.

FIG. 4 is a diagram of indoor environment 401 having a ceiling 490 mounted wireless access point 440 at a distance 495 above floor 450. A tip of wireless access point 440 is mounted at a distance 457 from ceiling 490 and at a height 455 from floor 450. Persons 410A-C each have respective mobile devices 420A-C to receive respective signals 425A-C from wireless access point 440. As samples are collected, mobile devices 420A-C use network 180 to relay samples to sample receiver 366 from FIG. 3. In a variation, collected samples can be stored on mobile devices 420A-C and relayed to sample receiver 366 at a later time.

In an embodiment, a plurality of samples collected from unknown locations in indoor environment 490 used by known distance estimator 362 to estimate a known distance propagation loss for the indoor environment. In one example, this known distance propagation loss corresponds to the PL($d_0$) 220 value from equation 200 on FIG. 2. These samples can be collected by multiple mobile devices 420A-C from random locations within the indoor space.

The illustrative stages B1-B3 below describe a sample process for determining a known distance propagation loss (PL($d_0$) 220). Embodiments generate this known distance propagation loss for the purposes of generating an indoor environment propagation loss model. This known distance propagation loss is a propagation characteristic of indoor environment 190. Stages B1-B3 are listed below:

B1. Signals 425A-C are received by an embodiment of sample receiver 366 from respective mobile devices 420A-C at respective floor positions 426A-C. It should be noted that floor position 426B is located directly below wireless access point 440 on floor 450. Because the height 455 of wireless access point 440 is known, distance 495 from wireless access point 440 to mobile device 420B can be estimated. One approach to estimation of distance 495 subtracts an estimated distance 458 from floor 450 from ceiling height 455. To improve accuracy, distance 457 from the ceiling to the tip of the wireless access point 440 can also be subtracted.

B2. Of the three samples received, known distance estimator 362 selects a sample 425B estimated to be collected from a floor position 426B directly underneath wireless access point 440. One approach to selecting signal 425B as the signal received by a mobile device at floor position 426B is to select the signal with the strongest signal strength of the three signals 425A-C. Because signal 425B is the closest, this collected signal will likely be the strongest, and thus, at or near position 426B. It should be noted that, although three samples 425A-C are shown collected in FIG. 4, in an exemplary embodiment a much larger number of samples are collected and processed by an approach detailed in stage B2.

B3. Once estimated distance 495 is generated based on collected sample 425B, a base propagation characteristic of indoor environment 401 can be generated. Combining an estimated height 495, a known transmission strength of wireless access point 440, and a measured signal strength of signal 425B, a known distance propagation loss can be estimated. As discussed with reference to FIG. 2 above, in formula 200, $PL(d_0)$ 220 is the value of a known distance propagation loss indoor environment 401. $PL(d_0)$ 220 in equation 200 is set equal to the determined known distance propagation loss.

It is important to note that, in different embodiments, the useful values noted above—the signal strength of wireless access point 440, distances 455, 457 and 458—can all be estimated values and need not be precise retrieved measurements. In terms of retrieving these values for stage B3, the discussion of FIG. 5 below describes an indoor environment storage resource that can provide different useful values based on an identification of a building associated with indoor environment 401.

In the example where the log path data loss equation from FIG. 2 is used, this characteristic is $PL(d_0)$ 220, the indoor signal propagation loss at a known distance $d_0$. It would be appreciated by one having skill in the relevant art(s), given the description herein, that the above described approach described by stages B1-B3 above can be used for other propagation loss equations as well.

It should also be noted that samples collected from other estimated positions within an indoor environment can provide known distances comparable to distance 495. In another example, floor positions 426B-C may not allow user access, e.g., a mall kiosk may be placed in this position. Floor position 426A may also be on the edge of a suspended mezzanine, with positions 426B-C being in midair above a floor below. In this example, the distance from position 426A to wireless access point 440 can be a known indoor environment characteristic similar to distance 495 in the examples above. One having skill in the relevant art(s), given the description herein, will appreciate other examples comparable distances can be estimated based on indoor environment characteristics and signal strengths.

Indoor Environments

Figure 5:
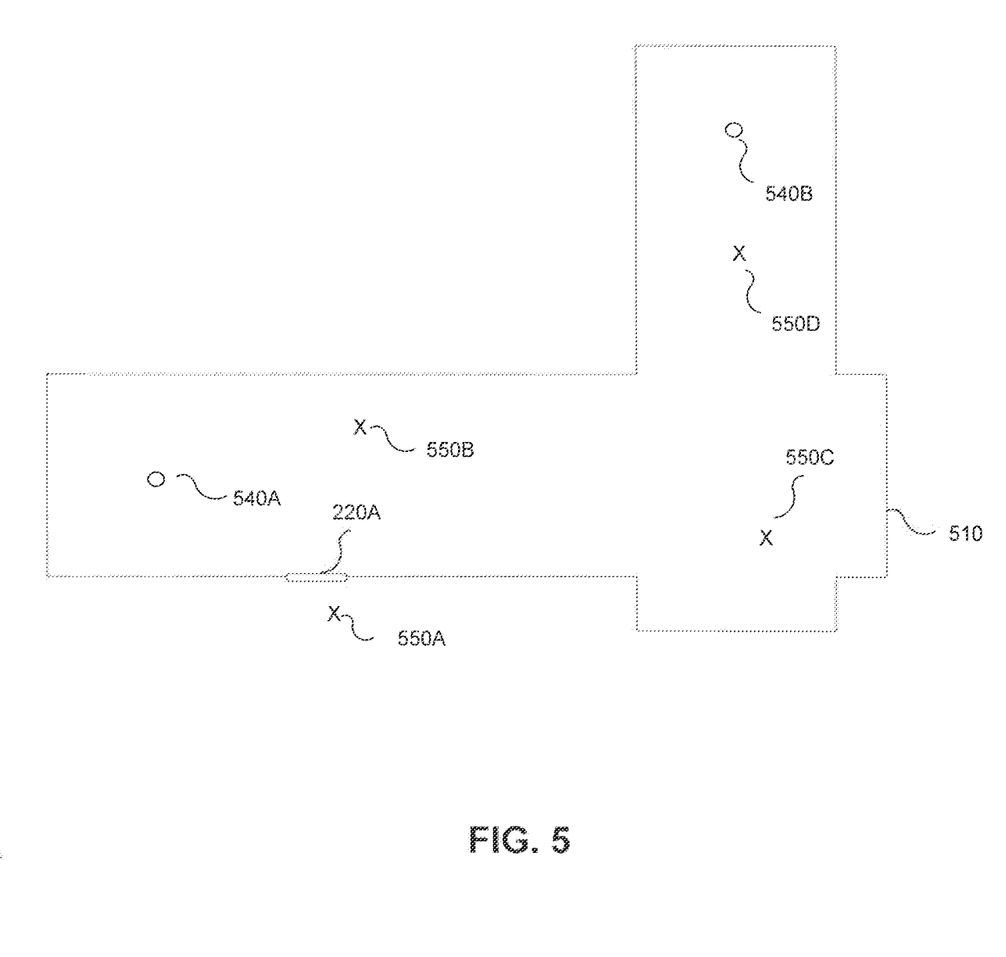
FIG. 5 is a map of an indoor environment having wireless access points and collected samples, according to an embodiment.

FIG. 5 is a map of an example indoor environment 510 having wireless access points 540A-B. Samples 550A-D mark locations in indoor environment 510 where wireless samples are received at mobile devices 420A-C. Sample 550A is outside and samples 550B-D are inside indoor environment 510.

Ceiling height 455, signal strength of wireless access point 440, and the mounting location of wireless access point 440, are examples of characteristics of indoor environment 401. Though an embodiment can perform the stages described above with reference to FIGS. 1-4 with estimated values, having more precise measurements of these characteristics can improve the accuracy of embodiments.

An embodiment of known distance propagation loss estimator 363 retrieves at least one characteristic of indoor environment 401 from indoor space reference storage device 370 to assist in the determination of a known distance propagation loss. In this example, the stored indoor space data 372 characteristic is a value corresponding to ceiling height 455. Additional characteristics can also be retrieved from indoor space reference 370 such as a value corresponding to distance 457 from ceiling to wireless access point 440 antenna. Distance 458 can also be retrieved from indoor space reference 370 and used to improve the estimation of embodiments. Distance 458—from floor 450 to the height of mobile device 458 when the sample is collected—can also be subtracted from ceiling height 455 to improve the accuracy of a measurement of the distance from wireless access point 440 to mobile device 420B.

In an embodiment, to use characteristics of a specific indoor environment 510, indoor environment 510 must be identified. For example, indoor environment 510 can be a specific shopping mall and/or apartment building. Having identified this specific location, an embodiment can retrieve different characteristics of indoor environment 510. As noted with reference to FIGS. 2-4, above different characteristics indoor environment 510 are useful to embodiments. For example, ceiling height 455, distance 457 from ceiling to the tip wireless access point 440, the broadcast signal strength of wireless access point 440 and the estimated distance 458 from floor 450 to mobile device 420B.

For different indoor spaces, in a variation of an embodiment, instead of specific values for each indoor space, standard values can be used for determinations described herein. Different approaches the identification of indoor environments are discussed below.

Identifying indoor Environments

It is important to note that, in the examples discussed above, signals 425A-C do not have location information associated with them, for example, from location determining features like a Global Positioning System (GPS) receiver. Because GPS signals are generally inaccessible from indoor environments, collected samples may not have associated location information.

To retrieve characteristics of indoor environment 510, embodiments use different approaches to identify the location of indoor environment 510. To identify a likely indoor environment to associate with collected signals, location determining features of mobile devices 420A-C can be used outside of indoor environment 510. For example, an embodiment uses mobile device 420B to collect a GPS location sample 550A at a point outside indoor environment. This sample may also include a signal strength for wireless access points 540A-B.

When person 410B carries mobile device 420B into indoor environment 510, this GPS receiver may not be able to generate location information, but an embodiment can estimate that indoor environment 510 is the likely position of mobile device 420B. In an embodiment, different approaches can be used to estimate this likelihood, including analyzing a path of multiple GPS fixes moving toward indoor environment 510 and/or a GPS fix that is obtained from inside indoor environment 510.

Given GPS location information, indoor space reference 370 can identify indoor environment 510. Based on the identified indoor environment 510, indoor space reference 370 can provide location characteristics for indoor environment 510.

Indoor Environment Scope

As shown in FIG. 5, an embodiment collects samples 550B-D from wireless access points 540A-B in indoor environment 510. These samples can be from multiple mobile devices 420A-C from all locations in indoor environment 510. As discussed below, these collected samples are aggregated and an indoor propagation model is generated for all of indoor environment 510. In this example, indoor environment 510 could be a single building such as an office building, an apartment or a shopping mall. The assumption that underlies this example is that an entire indoor environment can be approximated by a single propagation model generated by an embodiment.

In another embodiment, different sections of an indoor environment have different propagation characteristics. For example, a warehouse segment can be located next to an office segment in a single building. While this example is a single indoor environment, each segment can have different propagation characteristics, for example, because of signal interference. In addition, the useful characteristics of one segment of an indoor environment may not extend to another segment. For example, ceiling height in the warehouse segment can be different from the shopping mall segment.

To minimize estimation errors, in this different segment example, one approach has each individual segment having its own retrieved characteristics, and generated propagation model.

Generating a Signal Propagation Model

As discussed with reference to FIGS. 6A-B below, an embodiment of SDC generator 364 uses the propagation characteristic estimated above to generate shadow distribution curves (also known as "probability distributions" and "theoretical RSS distributions") based on different coefficients. In an example using the equation from FIG. 2, the estimated propagation characteristic provides the value of $PL(d_0)$, and shadow values are selected for $\eta$ (230) and $X_\sigma$ (240).

A discussed with reference to FIG. 6C below, once the shadow distribution curves are generated, a sample distribution curve is generated by an embodiment based on collected "crowdsourced" sample data. As described below, the generated sample distribution curve can be curve fitted to the generated sample distribution curves and a match can be selected. Once selected, the matched sample distribution curve provides a propagation model for the indoor environment. One approach used by an embodiment to curve fit the curves is the least squares curve fitting approach.

Figure 6A:
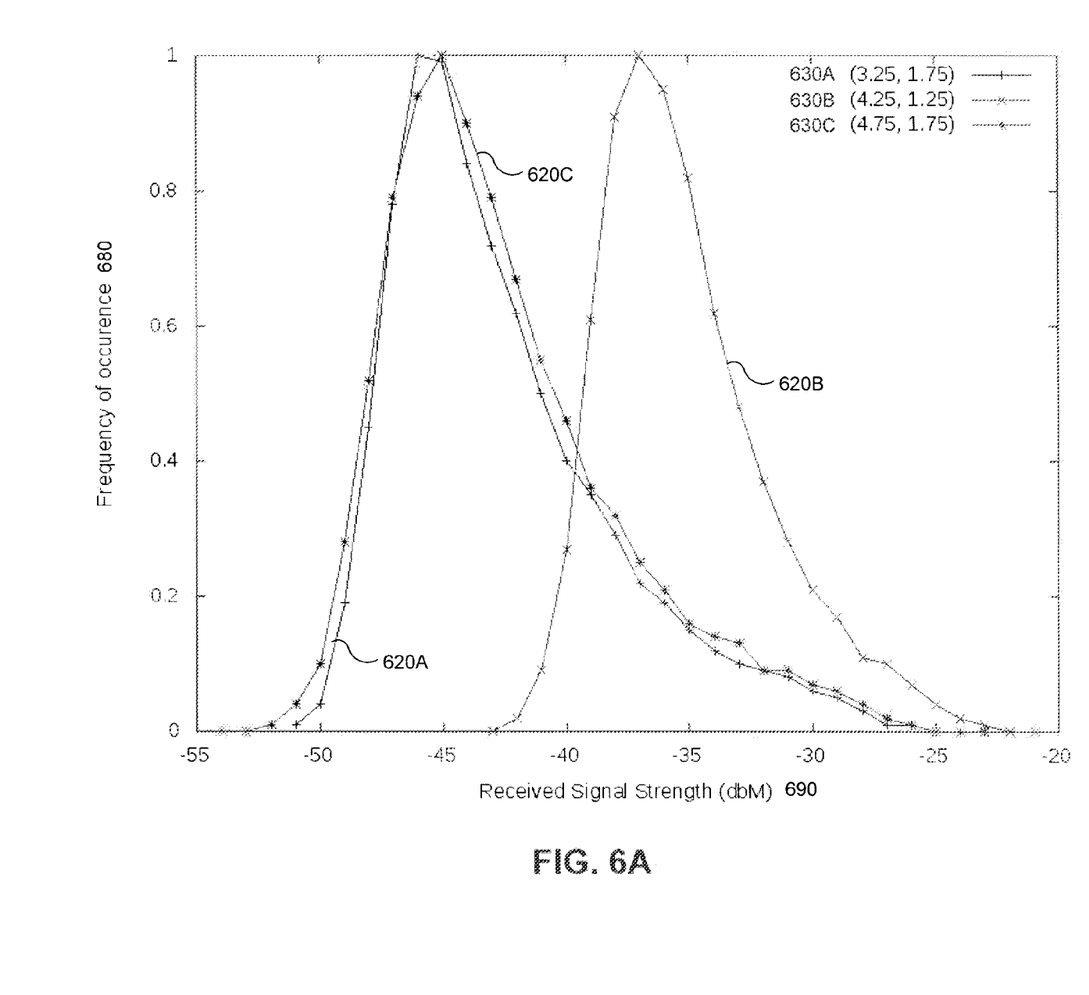
FIGS. 6A-B are charts of shadow distribution curves, according to an embodiment.
Figure 6B:
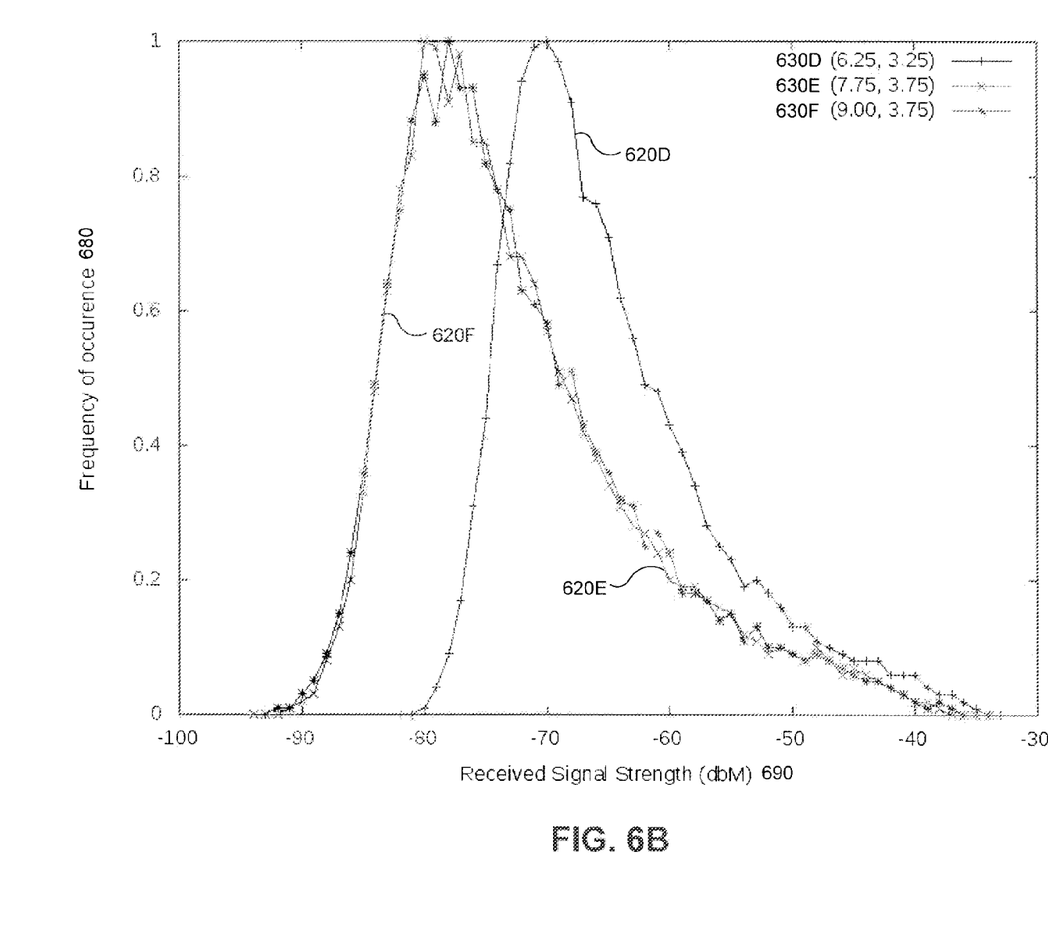

FIGS. 6A-B are charts of generated shadow distribution curves 620A-F. Each shadow distribution curve shows estimated frequencies of occurrence 680 on the Y-axis and received signal strength 690 on the X-axis. Each of legend entries 630A-F is associated with shadow curves 620A-F. Legend entries 630A-F display the combinations used to generate each shadow distribution curve 620A-F.

In different embodiments, different numbers of shadow distribution curves 620A-F can be generated. The number generated is an implementation detail, and is generally a balance between the processing power required to generate/analyze the shadow distribution curves, and an increase in propagation model accuracy. The increase in accuracy can result from having a larger number of shadow distribution curves to select from in stages described with reference to FIG. 6C below.

Figure 6C:
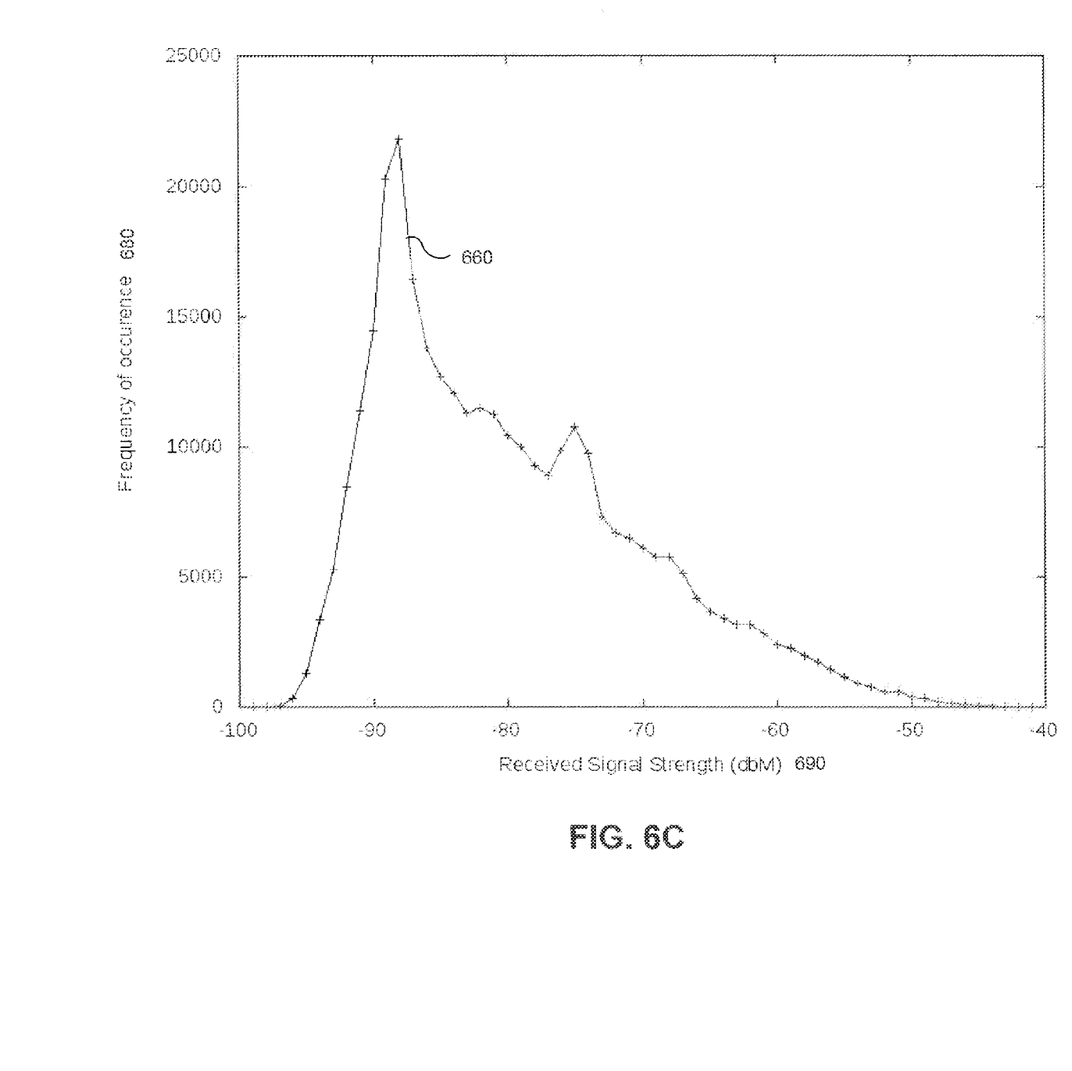
FIG. 6C is a chart of a collected sample distribution curve, according to an embodiment.

FIG. 6C is a chart that depicts data associated with a plurality of collected signal samples. Sample distribution curve 660 is based on frequencies of occurrence 680 on the Y-axis and received signal strength 690 of samples on the X-axis.

The illustrative stages C1-C11 below describe a sample process for estimating values for $\eta$ and $X_\sigma$ using a curve-fit over probability distributions generated by different values of $\eta$ and $X_\sigma$, according to an embodiment. Stages C1-C11 are listed below:

C1. As noted above, first a plurality of shadow distribution curves are generated using the propagation characteristic determined, for example, by stages B1-B3 above. Sample shadow distribution curves 620A-F are shown on FIGS. 6A-6B. The respective values for $\eta$ and $\sigma$ are shown in legend entries 630A-F. An example of shadow distribution curve 620A generated using the equation from FIG. 2 is described below. In this example, the value of PL(d0) is a loss of 1 dB for a wireless access point mounted on a 15 foot ceiling.

As shown at legend entry 630A, curve 620A has the following coefficient values—$\eta$=3.25, $X_\sigma$ with $\sigma$=1.75. With substitution, the path-loss equation from FIG. 2 thus becomes:

$$PL(dB)=1+10(3.25)\log(d/15)+X(\text{St. Dev. }1.75)$$

C2. Each of the shadow distribution curves 620A-F generated by shadow distribution curve generator 364 in stage C1 above is stored for use by later stages.

C3. Collect wireless signal strength samples from one or more mobile devices. Signal strength samples are transferred from mobile devices 420A-C to sample receiver 366 on server 150.

C4. As discussed above with reference to FIG. 4, by using GPS samples for example, determine whether each collected sample was likely collected from inside indoor environment 510.

C5. Collected samples that are estimated to have not been collected from inside indoor environment 510 are removed from the sample set. One approach to estimating whether a sample was collected inside indoor environment 510 uses GPS measurements.

C6. An embodiment assumes samples collected within indoor environment 510 are collected from random locations around indoor environment 510. This embodiment also assumes that wireless access points from which samples are received are dispersed randomly throughout indoor environment 510.

C7. Based on the collected samples, sample distribution curve 660 is generated using collected sample distribution curve (CSDC) generator 368. It is important to note that, sample distribution curve 660 is generated without knowing $\eta$ and $X_\sigma$ values. As show in FIG. 6C, sample distribution curve 660 is based on the frequency of occurrence 680 of a particular received signal strength 690.

C8. Once a sufficient number of samples are collected, curve fitter 369 uses a curve-fitting technique to compare sample distribution curve 660 to stored shadow distribution curves 620A-F. As would be appreciated by one having skill in the relevant art(s), given the description herein, curves used herein need not be compared graphically. Curves can exist as sets of data, and mathematical approaches can be used by embodiments to select which of curves 620A-F match sample distribution curve 660. In an embodiment, a least-squares approach is used for curve matching.

C9. Based on the curve fitting process of stage C8, curve 620F is selected as the closest match. Based on the selection of shadow distribution curve 620F, as shown on legend 630F, an $\sigma$ of 9.00 and an $\sigma$ of 3.75 is indicated. These values represent that values of $\eta$ and $\sigma$ that likely apply to indoor environment 410.

C10. Combining the estimated values of $\eta$ and a determined by stages C1-C9 with the value of PL(d0) determined by stages B1-B5 above yields a complete path-loss equation 200 from FIG. 2.

C11. Propagation model generator 160 outputs completed path-loss equation 200 to wireless distance estimator 390. In an example, using path-loss equation 200, a signal strength sample from wireless access point 540A in indoor environment 510 can be analyzed to estimate a distance from the access point.

Method

Figure 7:
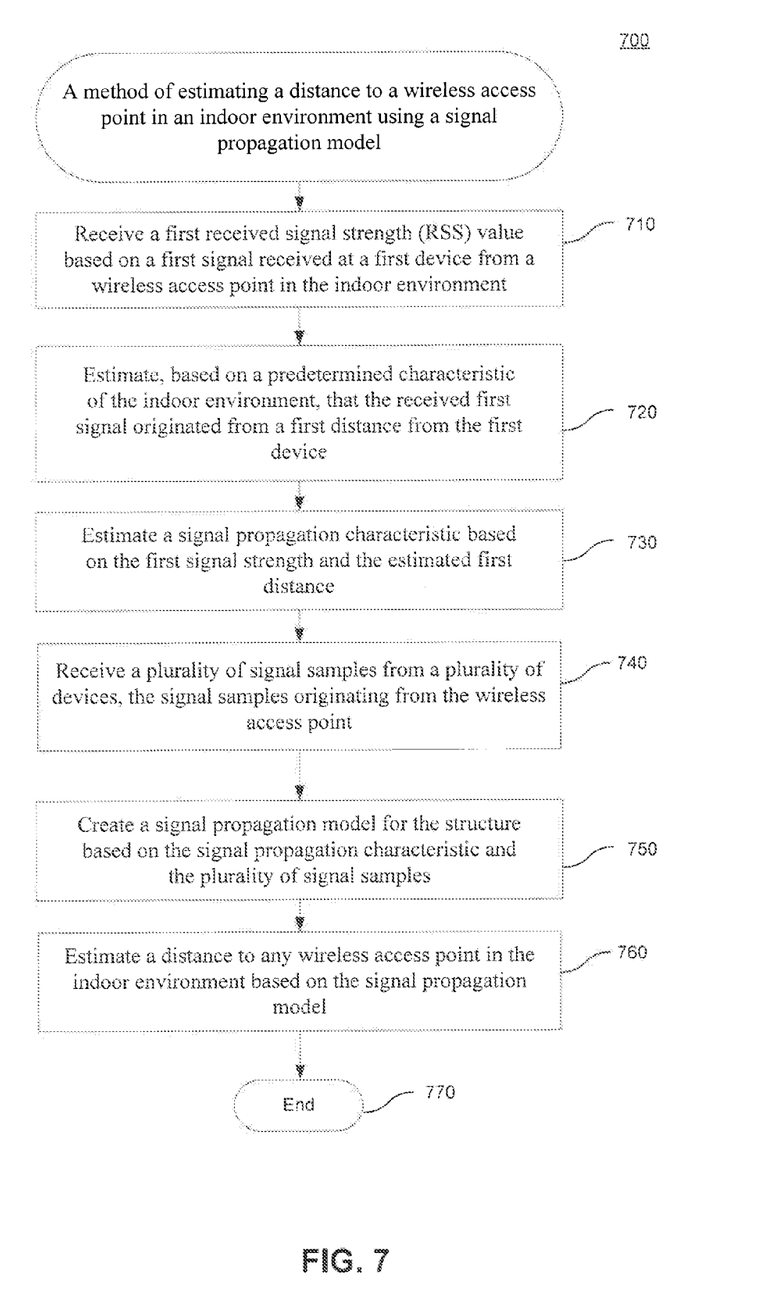
FIG. 7 is a diagram that shows a method of estimating a distance to a wireless access point in an indoor environment using a signal propagation model, according to an embodiment.

FIG. 7 illustrates an exemplary method 700 of estimating a distance to a wireless access point in an indoor environment using a signal propagation model. As shown in FIG. 7, method 700 begins at stage 710 where a first received signal strength (RSS) value is received based on a first signal received at a first device is received from a wireless access point in the indoor environment. For example, a first received signal strength (RSS) value is received at server 150 based on a signal 145A received at a mobile device 120A is received from wireless access point 140 in indoor environment 190. Once stage 710 is complete, method 700 proceeds to stage 720.

At stage 720, based on a predetermined characteristic of the indoor environment, estimate that the received first signal originated from a first distance from the first device. In an example, based on ceiling height 455, an estimate that signal 425B originated from mobile device 420B in position 495 underneath wireless access point 440. Based on position 495 and ceiling height 455 a distance from mobile device 420B to wireless access point 140 is estimated. Once stage 720 is complete method 700 proceeds to stage 730.

At stage 730, a signal propagation characteristic is estimated based on the first signal strength and the estimated first distance. For example, a known distance propagation loss is estimated based on the signal strength of signal 425B and the estimated distance from mobile device 420B to wireless access point 140. Once stage 730 is complete, method 700 proceeds to stage 740.

At stage 740, a plurality of signal samples from a plurality of devices, the signal samples originating from the wireless access point. For example, signal samples originating at wireless access point 140 are received at server 150 from mobile devices 120A-B. Once stage 740 is complete, method 700 proceeds to stage 750.

At stage 750, a signal propagation model is created for the structure based on the signal propagation characteristic and the plurality of signal samples. For example, a signal propagation model is created by propagation model generator 160 for indoor environment 190 based on the estimated known distance propagation loss and the plurality of wireless access point 140 signal samples received from mobile devices 120A-B. Once stage 750 is complete, method 700 proceeds to stage 760.

At stage 760, a distance to any wireless access point in the indoor environment is estimated based on the signal propagation model. For example, a distance from mobile device 120A to wireless access point 140 is estimated by wireless distance estimator in indoor environment 190 based on the signal propagation model generated by propagation model generator 160. After stage 760, method 700 ends at stage 770.

Example Computer System Implementation

Figure 8:
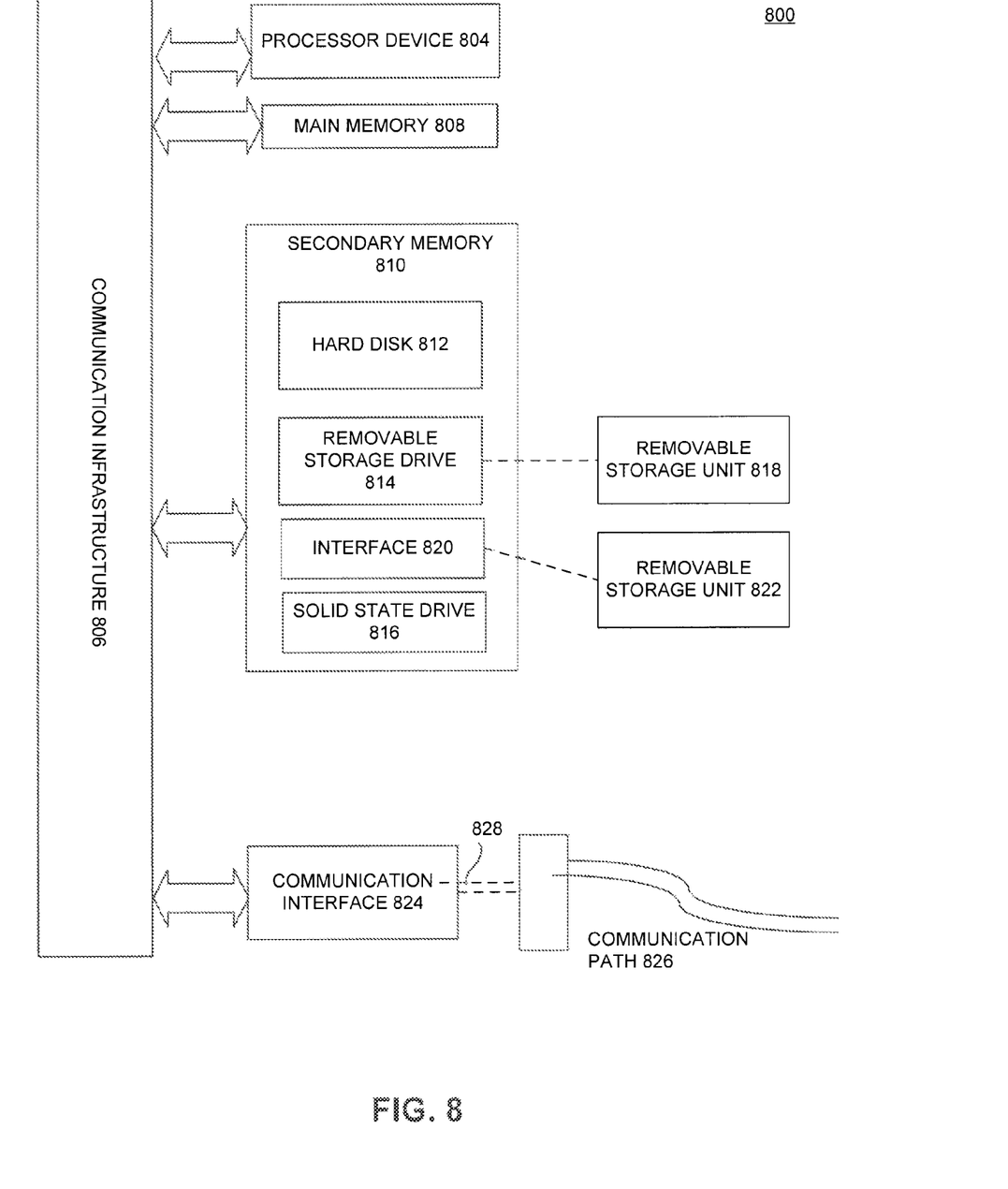
FIG. 8 is a block diagram of an example computer system that may be used to implement an embodiment.

FIG. 8 illustrates an example computer system 800 in which embodiments or portions thereof may be implemented. For example, components of FIGS. 1 and 3-4 including server 150, and stages of method 700 of FIG. 7 may be implemented in computer system 800 using hardware, software, firmware, tangible computer readable media having instructions stored thereon, or a combination thereof and may be implemented in one or more computer systems or other processing systems. Hardware, software or any combination of such may embody any of the modules/components in FIGS. 1 and 3-4, and any stage in FIG. 7. Mobile devices 120A-B and 420A-C, as well as server 150, can also be implemented using components of computer system 800.

If programmable logic is used, such logic may execute on a commercially available processing platform or a special purpose device. One of ordinary skill in the an may appreciate that embodiments of the disclosed subject matter can be practiced with various computer system and computer-implemented device configurations, including smartphones, cell phones, mobile phones, tablet PCs, multicore multiprocessor systems, minicomputers, mainframe computers, computer linked or clustered with distributed functions, as well as pervasive or miniature computers that may be embedded into virtually any device.

Various embodiments are described in terms of this example computer system 800. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

For instance, at least one processor device and a memory may be used to implement the above described embodiments. Processor device 804 may be a special purpose or a general purpose processor device. As will be appreciated by persons skilled in the relevant art, processor device 804 may also be a single processor in a multi-core/multiprocessor System, such system operating alone, or in a cluster of computing devices operating in a cluster or server farm. Processor device 804 is connected to a communication infrastructure 806, for example, a bus, message queue, network or multi-core message-passing scheme.

Computer system 800 also includes a main memory 808, for example, random access memory (RAM), and may also include a secondary memory 810. Secondary memory 810 may include, for example, a hard disk drive 812, removable storage drive 814 and solid state drive 816. Removable storage drive 814 may include a floppy disk drive, a magnetic tape drive, an optical disk drive, a flash memory, or the like. The removable storage drive 814 reads from and/or writes to a removable storage unit 818 in a well known manner. Removable storage unit 818 may include a floppy disk, magnetic tape, optical disk, etc, which is read by and written to by removable storage drive 814. As will be appreciated by persons skilled in the relevant art, removable storage unit 818 includes a computer readable storage medium having stored therein computer software and/or data.

In alternative implementations, secondary memory 810 may include other similar means for allowing computer programs or other instructions to be loaded into computer system 800. Such storage means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in electronic, electromagnetic, optical, or other forms capable of being received by communications interface 824. This data may be provided to communications interface 824 via a communications path 826. Communications path 826 carries the data and may be implemented using wire or cable, fiber optics, a phone line, a cellular phone link, an RF link or other communications channels.

In this document, the terms "computer program storage medium" and "computer readable storage medium" are used to generally refer to media such as removable storage unit 818, removable storage unit 822, and a hard disk installed in hard disk drive 812. Computer program storage medium and computer readable storage medium may also refer to memories, such as main memory 808 and secondary memory 810, which may be memory semiconductors (e.g., DRAMs, etc.).

Computer programs (also called computer control logic) may be stored in main memory 808 and/or secondary memory 810. Computer programs may also be received via communications interface 824. Such computer programs, when executed, enable computer system 800 to implement embodiments as discussed herein. In particular, the computer programs, when executed, enable processor device 804 to implement the processes of embodiments, such as the stages in the method illustrated by method 700 of FIG. 7 discussed above. Accordingly, such computer programs represent controllers of the computer system 800. Where embodiments are implemented using software, the software may be stored in a computer program product and loaded into computer system 800 using removable storage drive 814, interface 820, hard disk drive 812 or communications interface 824.

Embodiments also may be directed to computer program products comprising software stored on any computer readable medium. Such software, when executed in one or more data processing devices, causes a data processing device(s) to operate as described herein. Embodiments may employ any computer useable or readable medium. Examples of computer useable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to methods, system and computer program products for estimating a distance to a wireless access point in an indoor environment using a signal propagation model. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of estimating a distance to a wireless access point in an indoor environment using a crowdsourced signal propagation model, comprising:

receiving, at a server, a first received signal strength (RSS) value based on a first signal received at a first device from a wireless access point in the indoor environment;

estimating at the server, based on a predetermined characteristic of the indoor environment, that the received first signal originated from a first distance from the first device;

estimating, at the server, a signal propagation characteristic based on the first signal strength and the estimated first distance;

receiving, at the server, a plurality of signal samples from a plurality of devices via a network, the signal samples originating from the wireless access point;

creating, at the server, a crowdsourced signal propagation model for the indoor environment based on the signal propagation characteristic and the plurality of signal samples including determining a closest match between the plurality of signal samples and one of a plurality of distribution curves, each of the plurality of distribution curves illustrating estimated frequencies of occurrence of different received signal strengths corresponding to different values used with a path loss equation; and estimating a distance to any wireless access point in the indoor environment based on the crowdsourced signal propagation model.

2. The method of claim 1, wherein estimating, based on a predetermined characteristic of the indoor environment, that the received first signal originated from a first distance comprises:

determining that the first signal strength is at an estimated maximum; and estimating the first distance based on a predetermined ceiling height of the indoor environment.

3. The method of claim 1, wherein estimating, based on a predetermined characteristic of the indoor environment, that the received first signal originated from a first distance comprises retrieving the predetermined characteristic of the indoor environment from a library having of characteristics of a plurality of indoor environments.

4. The method of claim 3, wherein retrieving the predetermined characteristic of the indoor environment from a library having of characteristics of a plurality of indoor environments comprises retrieving the predetermined characteristic of the indoor environment from the library based on a GPS reading, wherein the GPS reading is associated with the indoor environment.

5. The method of claim 1, wherein creating the crowdsourced signal propagation model for the structure based on the signal propagation characteristic and the plurality of signal samples comprises:

generating a sample distribution curve based on the collected plurality of signal samples;

comparing the generated sample distribution curve to the plurality of propagation distribution curves; and generating crowdsourced signal propagation model based on the signal propagation characteristic and the comparison of the sample distribution curve to the plurality of propagation distribution curves.

6. The method of claim 5, wherein generating a plurality of propagation distribution curves based on the signal propagation characteristic comprises:
using the following equation to generate each propagation distribution curve:

$$PL(dB)=PL(d_0)+(\text{First Value})*\log(d/d_0)+\text{Second Value}$$

wherein
PL (dB) is a propagation loss as a distance d,
PL ($d_0$) is a known distance propagation loss, wherein the known distance is do,
first value is a value corresponding to a measure of how fast a wireless signal degrades over a distance, and
$X_{Second\ Value}$ is a value X corresponding to a variable component that corresponds to a path loss variability with a standard deviation of the second value,
wherein each curve is generated with selected first and second values.

7. The method of claim 1, wherein the estimating a signal propagation characteristic based on the first signal strength and the estimated first distance comprises estimating a known distance propagation loss based on the first signal strength and the estimated first distance.

8. The method of claim 1 further comprising estimating the size of the indoor environment based on the collected signal samples.

9. The method of claim 1 further comprising estimating the size of the indoor environment based on GPS readings collected along with the collected signal samples.

10. A system for estimating a distance from a wireless access point inside an indoor environment using a crowdsourced signal propagation model, comprising:
a sample receiver configured to receive, via a network: (i) a first received signal strength (RSS) value based on a first signal received at a first device from a first access point in the indoor environment, and (ii) a plurality of signal samples from a plurality of devices, the signal samples originating from a wireless access point inside the indoor environment;
a propagation characteristic estimator configured to estimate, based on a predetermined characteristic of the indoor environment, that the received first signal originated from a first distance from the first device, wherein a signal propagation characteristic is generated based on the first signal strength and the estimated first distance;
a propagation model generator configured to create a crowdsourced signal propagation model for the indoor environment based on the signal propagation characteristic and the plurality of signal samples, wherein the propagation model generator determines a closest match between the plurality of signal samples and one of a plurality of distribution curves, each of the plurality of distribution curves illustrating estimated frequencies of occurrence of different received signal strengths corresponding to different values used with a path loss equation; and
a wireless distance estimator configured to estimate the distance any wireless access point in the indoor environment based on the crowdsourced signal propagation model.

11. The system of claim 10, wherein the propagation characteristic estimator is configured to determine that the first signal strength is at an estimated maximum and estimate the first distance based on a predetermined ceiling height of the indoor environment.

12. The system of claim 10, wherein the propagation characteristic estimator is configured to retrieve the predetermined characteristic of the indoor environment from a library having of characteristics of a plurality of indoor environments.

13. The system of claim 12, wherein the propagation characteristic estimator is configured to retrieve the predetermined characteristic of the indoor environment from a library having of characteristics of a plurality of indoor environments comprises retrieving the predetermined characteristic of the indoor environment from the library based on a GPS reading, wherein the GPS reading is associated with the indoor environment.

14. The system of claim 10, wherein the propagation model generator is configured to create crowdsourced signal propagation model for the structure based on the signal propagation characteristic and the plurality of signal samples by a process comprising:
generating a sample distribution curve based on the collected plurality of signal samples;
comparing the generated sample distribution curve to the plurality of propagation distribution curves; and
generating the crowdsourced signal propagation model based on the signal propagation characteristic and the comparison of the sample distribution curve to the plurality of propagation distribution curves.

15. The system of claim 14, wherein the propagation model generator is configured to generate a plurality of propagation distribution curves based on the signal propagation characteristic using the following equation to generate each propagation distribution curve:

$$PL(dB)=PL(d_0)+(\text{First Value})*\log(d/d_0)+X\text{ Second Value wherein}$$

PL (dB) is a propagation loss as a distance d,
PL ($d_0$) is a known distance propagation loss, wherein the known distance is do,
first value is a value corresponding to a measure of how fast a wireless signal degrades over a distance, and
$X_{Second\ Value}$ is a value X corresponding to a variable component that corresponds to a path loss variability with a standard deviation of the second value, wherein each curve is generated with selected first and second values.

16. The system of claim 10, wherein the propagation characteristic estimator is configured to estimate the signal propagation characteristic based on the first signal strength and the estimated first distance comprises estimating a known distance propagation loss based on the first signal strength and the estimated first distance.

17. A non-transitory computer-readable medium having computer-executable instructions stored thereon that, when executed by a computing device, cause the computing device to perform a method of estimating a distance to a wireless access point in an indoor environment using a crowdsourced signal propagation model, comprising:
receiving a first received signal strength (RSS) value based on a first signal received at a first device from a wireless access point in the indoor environment;
estimating, based on a predetermined characteristic of the indoor environment, that the received first signal originated from a first distance from the first device;
estimating a signal propagation characteristic based on the first signal strength and the estimated first distance;

receiving a plurality of signal samples from a plurality of devices via a network, the signal samples originating from the wireless access point;

creating a crowdsourced signal propagation model for the indoor environment based on the signal propagation characteristic and the plurality of signal samples, including determining a closest match between the plurality of signal samples and one of a plurality of distribution curves, each of the plurality of distribution curves illustrating estimated frequencies of occurrence of different received signal strengths corresponding to different values used with a path loss equation; and estimating a distance to any wireless access point in the indoor environment based on the crowdsourced signal propagation model.

18. The method of claim 1, wherein the plurality of signal samples are stored at the plurality of devices upon being collected without being immediately relayed to the server, and wherein receiving the plurality of signal samples from the plurality of devices includes receiving the plurality of signal samples at a later time.

\* \* \* \* \*